US010905286B2

(12) United States Patent
Cuaresma et al.

(10) Patent No.: US 10,905,286 B2
(45) Date of Patent: Feb. 2, 2021

(54) FOOD PROCESSING DEVICE, COMPRISING A JAR

(71) Applicant: KONINKLIJKE PHILIPS N.V., Eindhoven (NL)

(72) Inventors: Samuel Jr. Agustin Cuaresma, Hong Kong (CN); Maarten Cornelis Jacob De Hoog, Hong Kong (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/620,990

(22) PCT Filed: Jul. 3, 2018

(86) PCT No.: PCT/EP2018/067863
§ 371 (c)(1),
(2) Date: Dec. 10, 2019

(87) PCT Pub. No.: WO2019/007920
PCT Pub. Date: Jan. 10, 2019

(65) Prior Publication Data
US 2020/0390287 A1 Dec. 17, 2020

(30) Foreign Application Priority Data
Jul. 6, 2017 (EP) .................................. 17180040

(51) Int. Cl.
*A47J 43/00* (2006.01)
*A47J 43/07* (2006.01)
*A47J 43/046* (2006.01)

(52) U.S. Cl.
CPC ......... *A47J 43/0727* (2013.01); *A47J 43/046* (2013.01)

(58) Field of Classification Search
CPC .............................. A47J 43/0727; A47J 43/046
See application file for complete search history.

(56) References Cited

U.S. PATENT DOCUMENTS

| 2014/0137750 A1 | 5/2014 | Arai |
| 2016/0257475 A1 | 9/2016 | Gervais |

(Continued)

FOREIGN PATENT DOCUMENTS

| CN | 102631153 A | 8/2012 |
| CN | 203207962 U | 9/2013 |

(Continued)

OTHER PUBLICATIONS

International Search Report and Written Opinion dated Sep. 12, 2018 for International Application No. PCT/EP2018/067863 Filed Jul. 3, 2018.

*Primary Examiner* — Anshu Bhatia

(57) ABSTRACT

The invention relates to a food processing device (100), comprising: a jar (10), a base unit (20), a vacuum mechanism (30) for sucking air from the jar (10), comprising a vacuum pump (31) arranged in the base unit (20) and a first vacuum conduit (32) extending through the base unit (20), and a lid (40) for covering the jar (10) and realizing air communication between the jar (10) and the base unit (20), wherein the vacuum mechanism (30) further comprises a second vacuum conduit (33) extending through the lid (40), wherein the respective vacuum conduits (32, 33) are engageable to each other through respective engaging ends (34, 35) thereof, and wherein at least one of the engaging ends (34, 35) of the respective vacuum conduits (32, 33) is displaceable between an outward position and a retracted position in the respective one of the base unit (20) and the lid (40).

12 Claims, 6 Drawing Sheets

(56) References Cited

U.S. PATENT DOCUMENTS

2017/0086622 A1* 3/2017 Chung ................ A47J 43/0716
2018/0132664 A1* 5/2018 Kim .................... A47J 43/0716

FOREIGN PATENT DOCUMENTS

| CN | 204120868 U | 1/2015 |
| CN | 205006706 U | 2/2016 |
| CN | 205548386 U | 9/2016 |
| CN | 205697384 U | 11/2016 |
| CN | 205697388 U | 11/2016 |
| EP | 3092923 A1 | 11/2016 |
| EP | 3141169 A1 | 3/2017 |

* cited by examiner

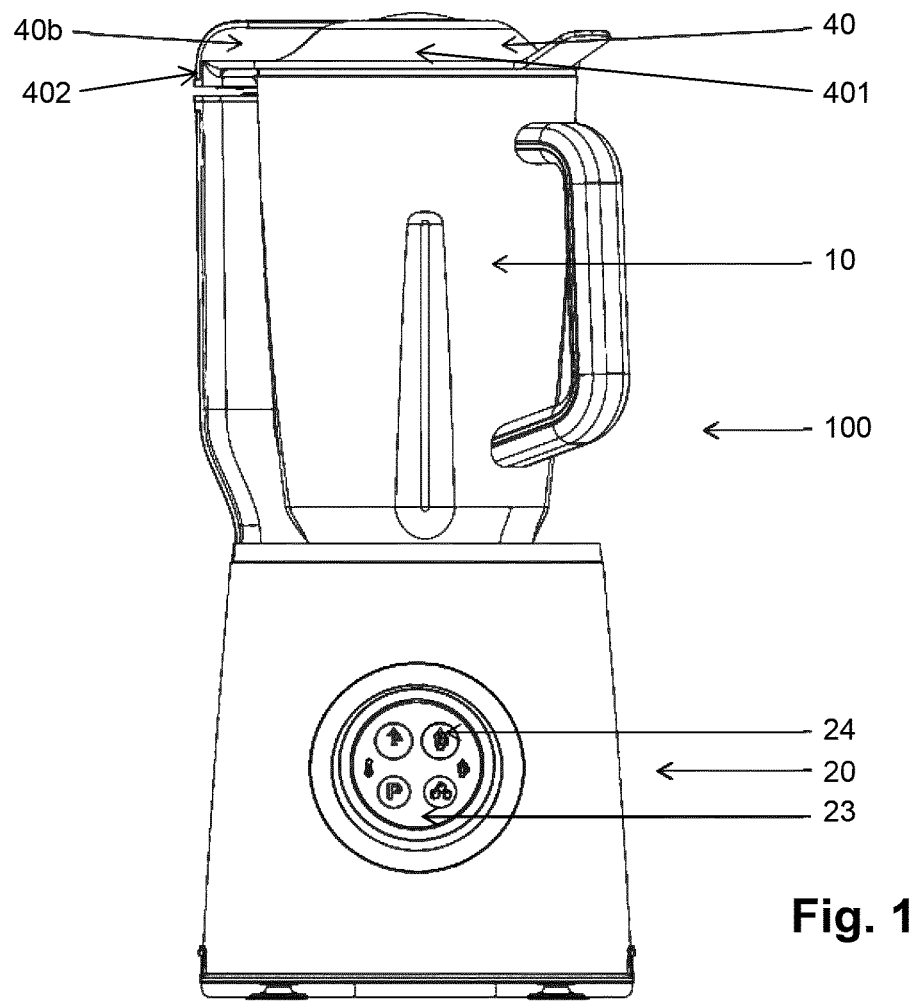
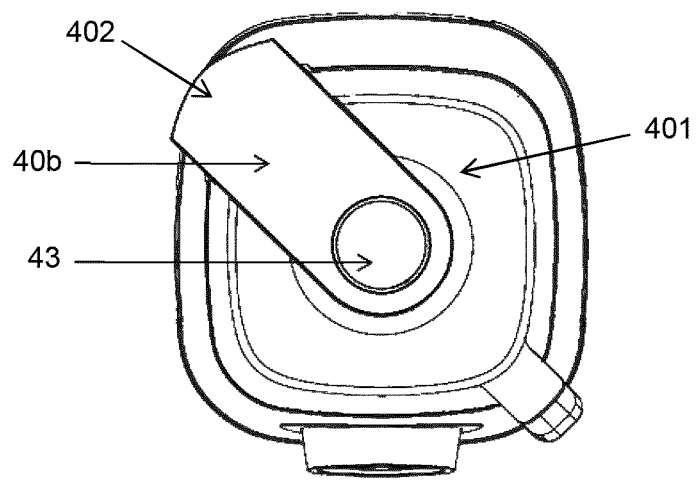
Fig. 1
Fig. 2

FOOD PROCESSING DEVICE, COMPRISING A JAR

CROSS REFERENCE TO RELATED APPLICATIONS

This application is the U.S. National Phase application under 35 U.S.C. § 371 of International Application No. PCT/EP2018/067863 filed Jul. 3, 2018, published as WO 2019/007920 on Jan. 10, 2019, which claims the benefit of European Patent Application Number 17180040.2 filed Jul. 6, 2017. These applications are hereby incorporated by reference herein.

FIELD OF THE INVENTION

The invention relates to a food processing device, comprising: a jar configured to contain food, a base unit configured to support and accommodate the jar, a vacuum mechanism configured to suck air from the jar, comprising a vacuum pump arranged in the base unit and a first vacuum conduit extending through the base unit and being coupled to the vacuum pump, and a lid configured to cover the jar and to realize air communication between the jar and the base unit, wherein the vacuum mechanism further comprises a second vacuum conduit extending through the lid, wherein the first vacuum conduit and the second vacuum conduit are engageable to each other through respective engaging ends thereof, and wherein at least one of the engaging ends of the first vacuum conduit and the second vacuum conduit is displaceable between an outward position and a retracted position in the respective one of the base unit and the lid.

BACKGROUND OF THE INVENTION

A food processing device as mentioned in the foregoing is suitable to be used as a blender in which food is mixed and food items are chopped to smaller bits in the process. In view thereof, the food processing device is equipped with a cutting tool that is intended to be placed in the jar and to be driven so as to move in the jar. In many known cases, the cutting tool comprises a number of cutting blades arranged on a shaft, wherein the shaft is driven so as to rotate about the longitudinal axis thereof during operation of the food processing device. A driving mechanism for driving the shaft may be arranged in the lid, in which case the shaft extends down from the lid into the jar, through an open top side of the jar, when the lid is in place on the jar. On the other hand, a driving mechanism for driving the shaft may be arranged in the base unit, in which case it may be so that the shaft extends up from the base unit into the jar, through a bottom of the jar, when the jar is in place on the base unit.

CN102631153A relates to a food processing device that is equipped with an electric vacuum pump for sucking air from the jar. Realizing underpressure in the jar is advantageous in view of the fact that oxidation of food is greatly reduced as a result thereof, so that nutritive loss of the food is limited, and taste and appearance of the food are maintained. In an embodiment, the known food processing device is of the design in which the vacuum mechanism comprises a vacuum pump arranged in the base unit, a first vacuum conduit extending through the base unit and being coupled to the vacuum pump, and a second vacuum conduit extending through the lid. In this embodiment, the respective engaging ends of the first vacuum conduit and the second vacuum conduit are shaped as parts of a spigot and socket joint, so that it is achieved that when the lid is put in place, a sealed engagement between the two vacuum conduits is realized. Hence, leakage of air at the interface of the two vacuum conduits is avoided, so that effective functioning of the vacuum mechanism is ensured.

CN205697384U relates to a vacuum food cooking device comprising a jar configured to contain food, a lid configured to cover the jar, a base unit configured to support and accommodate the jar, and a vacuum mechanism configured to suck air from the jar, comprising a vacuum pump arranged in the base unit and a vacuum conduit extending through the base unit and being coupled to the vacuum pump. The lid is provided with a central hole, and when an assembly of the jar and the lid is put in place on the base unit, the central hole is aligned with an end of the vacuum conduit of the base unit. In order guarantee a leaktight connection between the jar's interior and the vacuum conduit of the base unit through the central hole in the lid, the base unit is equipped with a suction port element that is movably arranged at the end of the vacuum conduit and a spring for biasing the suction port element in the direction of the lid. As a result of using the suction port element in the way as described, it is possible for the suction port element to follow movements of the lid and associated displacements of the central part of the lid where the central hole is located as may be caused by vibrations of the jar during operation of the device, so that the end of the vacuum conduit of the base unit remains properly connected to the jar's interior through the central hole in the lid under all circumstances.

SUMMARY OF THE INVENTION

It is an object of the invention to provide an effective way of realizing a sealed engagement between two vacuum conduits of a food processing device, particularly a first vacuum conduit associated with the base unit of the food processing device and a second vacuum conduit associated with the lid of the food processing device. Further, it is an object of the invention to minimize a risk of damage to the respective engaging ends of the first vacuum conduit and the second vacuum conduit in a process of putting the lid, particularly an assembly of the lid and the jar, in place with respect to the base unit.

In view of the foregoing, the invention provides a food processing device, comprising: a jar configured to contain food, a base unit configured to support and accommodate the jar, a vacuum mechanism configured to suck air from the jar, comprising a vacuum pump arranged in the base unit and a first vacuum conduit extending through the base unit and being coupled to the vacuum pump, and a lid configured to cover the jar and to realize air communication between the jar and the base unit, wherein the vacuum mechanism further comprises a second vacuum conduit extending through the lid, wherein the first vacuum conduit and the second vacuum conduit are engageable to each other through respective engaging ends thereof, wherein at least one of the engaging ends of the first vacuum conduit and the second vacuum conduit is displaceable between an outward position and a retracted position in the respective one of the base unit and the lid, wherein the first vacuum conduit and the second vacuum conduit are engaged to each other when the at least one of the engaging ends of the first vacuum conduit and the second vacuum conduit is at the outward position in the respective one of the base unit and the lid, and wherein the first vacuum conduit and the second vacuum conduit are disengaged from each other when the at least one of the engaging ends of the first vacuum conduit and the second vacuum conduit is at the refracted position in the respective one of the base unit and the lid, and wherein the food processing device comprises a driven actuator configured to displace the at least one one of the engaging ends of the first vacuum conduit and the second vacuum conduit in the respective one of the base unit and the lid to the outward position, and at least one resilient member configured to bias the at least one of the engaging ends of the first vacuum conduit and the second vacuum conduit in the respective one of the base unit and the lid to the retracted position.

According to the invention, at least one of the engaging ends of the first vacuum conduit and the second vacuum conduit is displaceable between an outward position and a retracted position in the respective one of the base unit and the lid, wherein the outward position is associated with engagement of the first vacuum conduit and the second vacuum conduit to each other, and wherein the retracted position is associated with disengagement of the first vacuum conduit and the second vacuum conduit from each other. On the basis of this notable feature, it is possible to have a situation in which the at least one of the engaging ends is kept in the retracted position during the process of putting the lid in place with respect to the base unit and to displace the at least one of the engaging ends towards the outward position only when the lid and the base unit are aligned with each other in the correct way, so that engagement between the respective engaging ends of the first vacuum conduit and the second vacuum conduit is established in a linear fashion only. A distance between the retracted position and the outward position of the at least one of the engaging ends does not need to be large in order for the invention to work. For example, the distance may be in a range of 1 mm to 10 mm, preferably in a range of 2 mm to 5 mm.

Within the framework of the invention, it is possible that both of the respective engaging ends of the first vacuum conduit and the second vacuum conduit are displaceable between an outward position and a retracted position in the respective one of the base unit and the lid. However, in order to have simplicity of design and to only have a minimum number of movable components in the food processing device, it may be preferred if one of the engaging ends of the first vacuum conduit and the second vacuum conduit is displaceable in the respective one of the base unit and the lid, wherein the other of the engaging ends has a fixed position in the respective other of the base unit and the lid. Hence, it is practical if one of the following possibilities is put to practice: (i) the engaging end of the first vacuum conduit is displaceable in the base unit, wherein the engaging end of the second vacuum conduit has a fixed position in the lid, or (ii) the engaging end of the second vacuum conduit is displaceable in the lid, wherein the engaging end of the first vacuum conduit has a fixed position in the base unit.

For the sake of clarity, it is noted that where a fixed position of an engaging end is mentioned in the preceding paragraph, this should be understood as being a fixed position of that engaging end in the respective one of the base unit and the lid, as indicated, which may also be defined as a fixed position of that engaging end with respect to the vacuum conduit extending therefrom. The fact that one of the engaging ends may have a fixed position in the respective one of the base unit and the lid does not exclude a design of the food processing device in which the engaging ends are movable with respect to each other, as the possibility of realizing relative movement of the engaging ends is independent from whether one of the engaging ends has a fixed position in the respective one of the base unit and the lid, or not. For example, it is possible to have a design in which the engaging end of the second vacuum conduit has a fixed position in the lid, and in which that engaging end is intended to be displaced along the engaging end of the first vacuum conduit by a sliding movement until the engaging ends are properly aligned.

Advantageously, the lid includes a cover area configured to cover the jar and a protruding area outside of the cover area, wherein the engaging end of the second vacuum conduit is located in the protruding area. Such a design of the lid enables positioning of the lid on both the jar and the base unit from a top side, which is a convenient option as far as the positioning action required from a user is concerned, and also as far as the need for movable parts in the food processing device is concerned.

The food processing device according to the invention comprises a driven actuator acting on at least one of the engaging ends of the first vacuum conduit and the second vacuum conduit in the respective one of the base unit and the lid for displacing the at least one of the engaging ends in the respective one of the base unit and the lid. For example, a linear actuator that is driven by an electric motor may be used. In such a case, assuming that a user of the food processing device puts the jar, the base unit and the lid in the correct position with respect to each other first before activating a vacuum process, it is practical if displacement of the at least one of the engaging ends in the respective one of the base unit and the lid is initiated no earlier than when input indicating a user's desire to start the vacuum process is received. In that respect, it is noted that the food processing device may comprise a user interface including a vacuum activation button, and a control mechanism for the driven actuator, wherein the control mechanism is configured to activate the driven actuator to put the at least one of the engaging ends of the first vacuum conduit and the second vacuum conduit in the respective one of the base unit and the lid to the outward position when the vacuum activation button is operated by a user.

The food processing device also comprises at least one resilient member configured to enable displacement of at least one of the engaging ends of the first vacuum conduit and the second vacuum conduit in the respective one of the base unit and the lid between the outward position and the retracted position. The driven actuator is configured to displace the at least one of the engaging ends of the first vacuum conduit and the second vacuum conduit to the outward position, wherein the at least one resilient member is configured to bias the at least one of the engaging ends to the retracted position. In this configuration, it can be achieved that the at least one of the engaging ends is kept in the outward position as long as the vacuum pump is in an operative condition and is automatically put back to the retracted position as soon as the vacuum pump is shut off and the at least one of the engaging ends is no longer under the influence of a force that serves to counteract the force exerted by the at least one resilient member.

A few of the practical possibilities existing within the framework of the invention are the following: (i) at least one of the first vacuum conduit and the second vacuum conduit comprises a hollow tube configured to allow a flow of air to pass through, (ii) one of the engaging ends of the first vacuum conduit and the second vacuum conduit comprises a cup-shaped portion, and (iii) at least one of the engaging ends of the first vacuum conduit and the second vacuum conduit comprises a flexible material. In respect of the latter possibility, it is noted that designing one engaging end so as to have a covering position over the other engaging end and using a flexible material in the one engaging end is very advantageous, as in that case, there is no need for any further measures for guaranteeing sealed engagement of the engaging ends. An example of a flexible material that is suitable for use in one or both of the engaging ends is rubber. The lid may include a one-way valve for only allowing a flow of air in the lid to be directed towards the engaging end of the second vacuum conduit, thereby preventing a reverse flow of air in the lid. The use of a one-way valve as mentioned contributes to realizing optimal effectiveness of the vacuum pump. Besides, the use of a one-way valve as mentioned offers a possibility of allowing vacuum to release from other components of the food processing device than the jar and an area of the lid that is configured for direct air communication with the jar as soon as operation of the vacuum pump is ended, so that the positions in the food processing device where vacuum is prevailing are limited to the actual positions where this is functional.

Further, the lid may include a pressure release valve for realizing air communication between the jar and the outside air. Hence, when the pressure release valve is activated, it is achieved that vacuum is released from the jar, which allows for easy disassembly of the food processing device, including removal of the lid from the jar.

The lid may be of a modular set-up, comprising at least two modules, wherein one of the modules is a vacuum module in which the second vacuum conduit is located, and wherein the vacuum module is detachable from the at least one other module. An integrated design of the lid, which is also included in the scope of the invention, involves the risk that cleaning liquid enters the second vacuum conduit when the lid is subjected to a wet cleaning action. Therefore, in such a design, a user should be careful when cleaning the lid and/or is obliged to only apply dry cleaning techniques, such as wiping the lid with a piece of cloth, which may not be very effective. In contrast, a modular design offers a possibility of removing the part in which the second vacuum conduit is located from the lid first before subjecting the rest of the lid to a cleaning action as desired. Also, a modular design of the lid as mentioned allows for omitting the vacuum module when it is not desired to have vacuum conditions prevailing in the jar while processing food.

The above-described and other aspects of the invention will be apparent from and elucidated with reference to the following detailed description of various possibilities relating to the concept of having a movable arrangement of at least one of the respective engaging ends of a first vacuum conduit and a second vacuum conduit in a food processing device that is designed to process food in vacuum conditions. For the sake of completeness, it is noted that in the present text, the word "vacuum" is to be understood for its practical meaning, i.e. so as to cover situations of lower pressure than ambient pressure that are an approximation to an actual vacuum.

BRIEF DESCRIPTION OF THE DRAWINGS

The invention will now be explained in greater detail with reference to the figures, in which equal or similar parts are indicated by the same reference signs, and in which:

FIG. 1 diagrammatically shows a side view of a food processing device according to a first embodiment of the invention;

FIG. 2 diagrammatically shows a top view of the food processing device shown in FIG. 1;

DETAILED DESCRIPTION OF EMBODIMENTS

Figure 3:
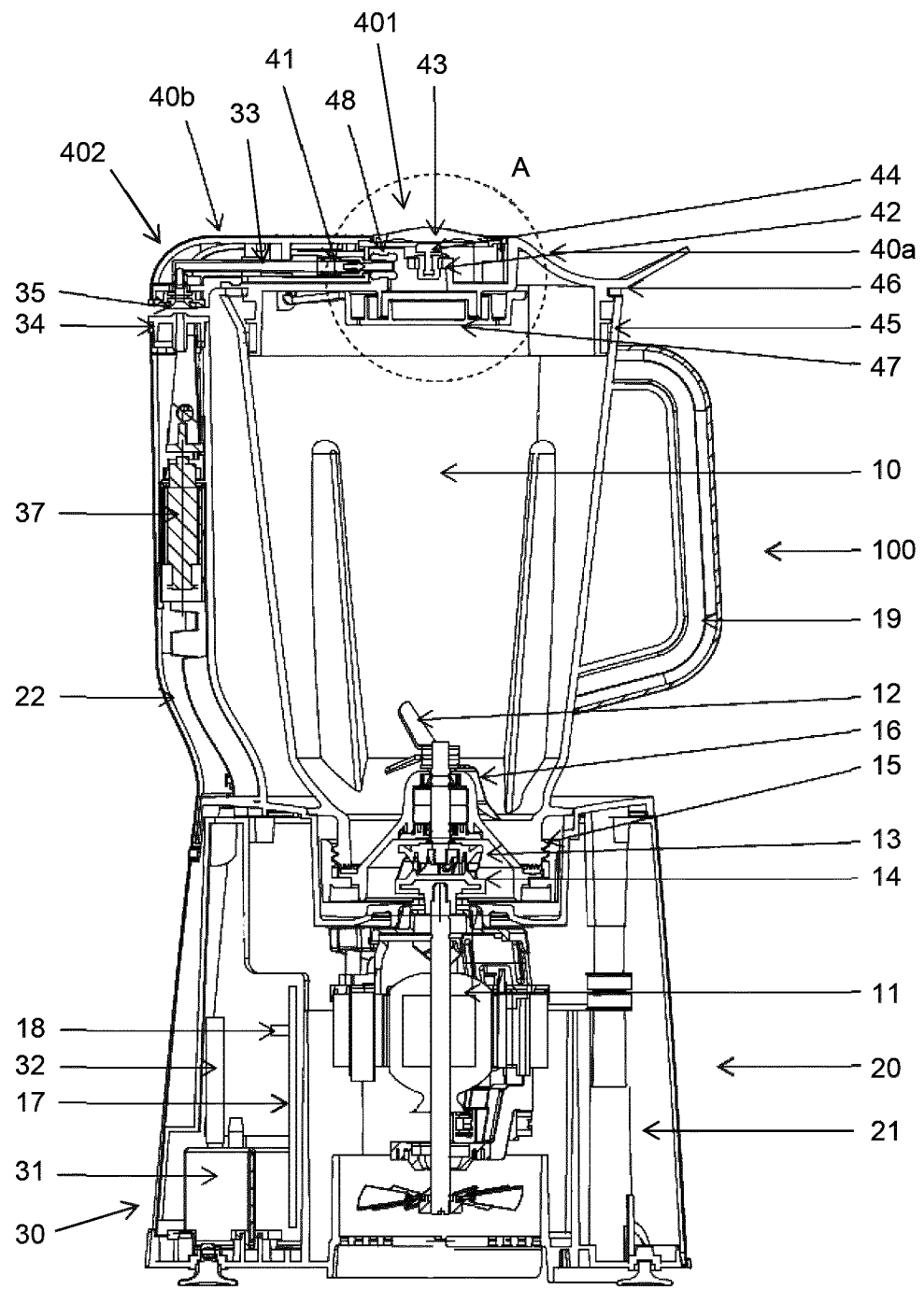
FIG. 3 diagrammatically shows a sectional view of the food processing device shown in FIG. 1.
Figure 4:
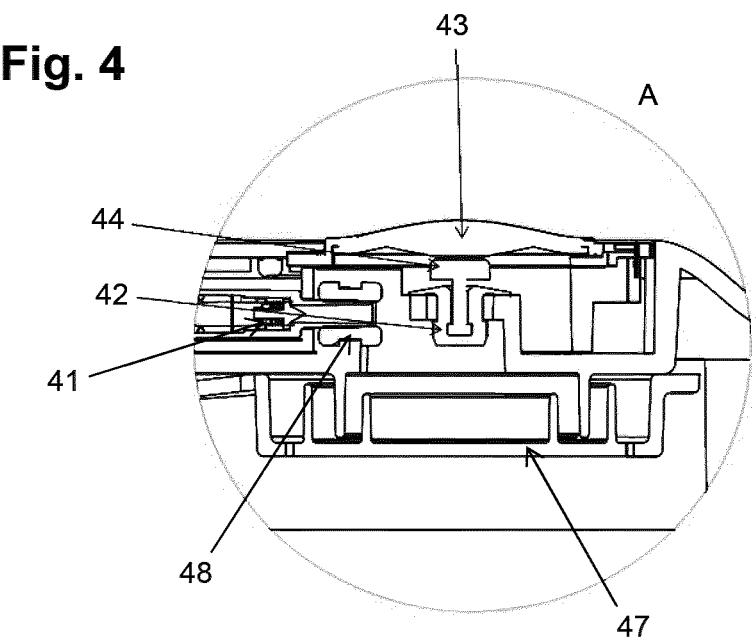
FIG. 4 diagrammatically shows a detail A of FIG. 3.

The invention is in the field of food processing devices, particularly food processing devices that are equipped with a vacuum mechanism for having a possibility of processing food under vacuum conditions, which is an advantageous possibility as applying the vacuum contributes to a smooth texture of the food and involves prevention of oxidation of the food as well as preservation of the nutritive value and the original taste of the food. The food processing device according to the invention is suitable to be used for processing any type of food, including fruits and vegetables, and may be equipped with any suitable type of tool for subjecting food to an action as desired, such as a cutting tool.

With reference to FIGS. 1-9, the details of a food processing device 100 according to a first embodiment of the invention will now be explained, particularly the details that are relevant in the context of the invention. The main components of the food processing device 100 are a jar 10 that is configured to contain food and that has an open top side, a base unit 20 that is configured to support and accommodate the jar 10, a vacuum mechanism 30 that is configured to suck air from the jar 10, and a lid 40 that is configured to cover the jar 10 and to realize air communication between the jar 10 and the base unit 20. The vacuum mechanism comprises a vacuum pump 31 that is arranged in the base unit 20, a first vacuum conduit 32 extending through the base unit 20 and being coupled to the vacuum pump 31, and a second vacuum conduit 33 extending through the lid 40. The first vacuum conduit 32 and the second vacuum conduit 33 are engageable to each other through respective engaging ends 34, 35 thereof. In the shown example, the lid 40 includes a cover area 401 configured to cover the jar 10 and a protruding area 402 outside of the cover area 401, the engaging end 35 of the second vacuum conduit 33 being present in the protruding area 402 so as to be accessible at a position outside of the jar 10 when the lid 40 is in place on the jar 10.

The jar 10 is removable from the food processing device 100 so as to allow a user of the device 100 to take the jar 10 and put food in the jar 10 at a position outside of the device 100, and also take the jar 10 and clean the jar 10 at a position outside of the device 100. Also, the lid 40 is a separate component. In this respect, it is noted that FIGS. 1-3 show the food processing device 100 in an assembled condition, i.e. a condition in which the jar 10, the base unit 20 and the lid 40 are in an operative position with respect to each other. In the assembled condition, the engaging end 34 of the first vacuum conduit 32 and the engaging end 35 of the second vacuum conduit 33 are engaged to each other so that the vacuum mechanism 30 provides an uninterrupted vacuum path from the jar 10 to the vacuum pump 31. In the following description, it is assumed that the food processing device 100 is in the assembled condition.

A notable function of the lid 40 is establishing a sealed engagement between the jar 10 and the base unit 20, so that when the vacuum pump 31 is in an active condition, underpressure is created in the jar 10. The lid 40 comprises a one-way valve 41 and a pressure release valve 42 as can be seen in the detail shown in FIG. 4. The one-way valve 41 is arranged and configured to maintain the underpressure in the jar 10, namely by only allowing a flow of air in the lid 40 to be directed towards the engaging end 35 of the second vacuum conduit 33, thereby preventing a reverse flow of air in the lid 40. The pressure release valve 42 can be operated by a user of the food processing device 100, to which end the lid 40 is equipped with a pressure release button 43. When a vacuum condition is prevailing in the jar 10 and the user depresses the button 43, open communication between the jar 10 and the outside air is realized, so that the vacuum is released from the jar 10 and it is possible for the user to remove the lid 40 from the jar 10.

Figure 5:
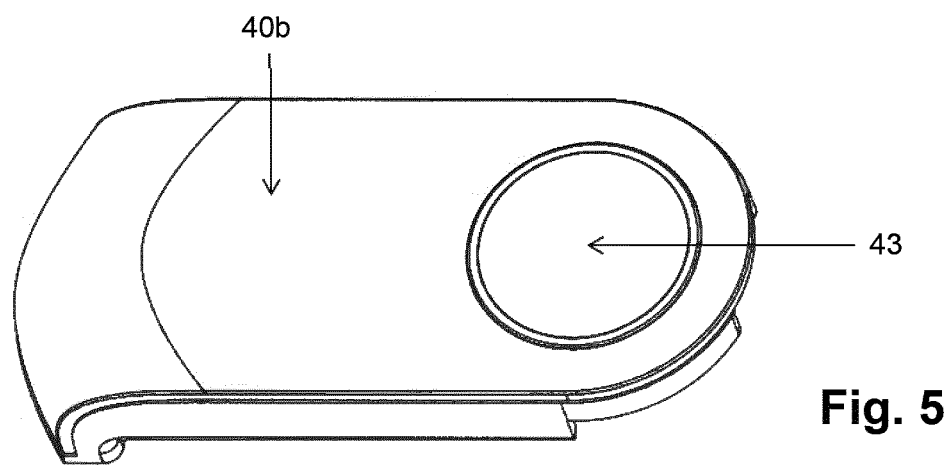
FIG. 5 diagrammatically shows a perspective view of a vacuum module of a lid that is part of the food processing device shown in FIG. 1.
Figure 6:
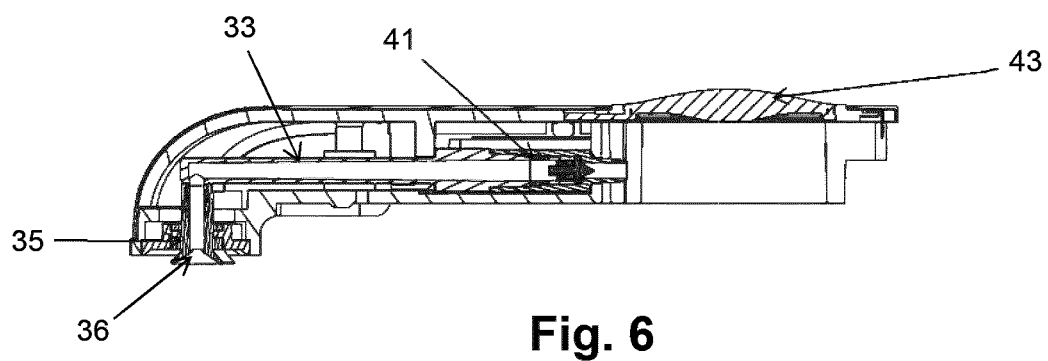
FIG. 6 diagrammatically shows a sectional view of the vacuum module of the lid shown in FIG. 5.
Figure 7:
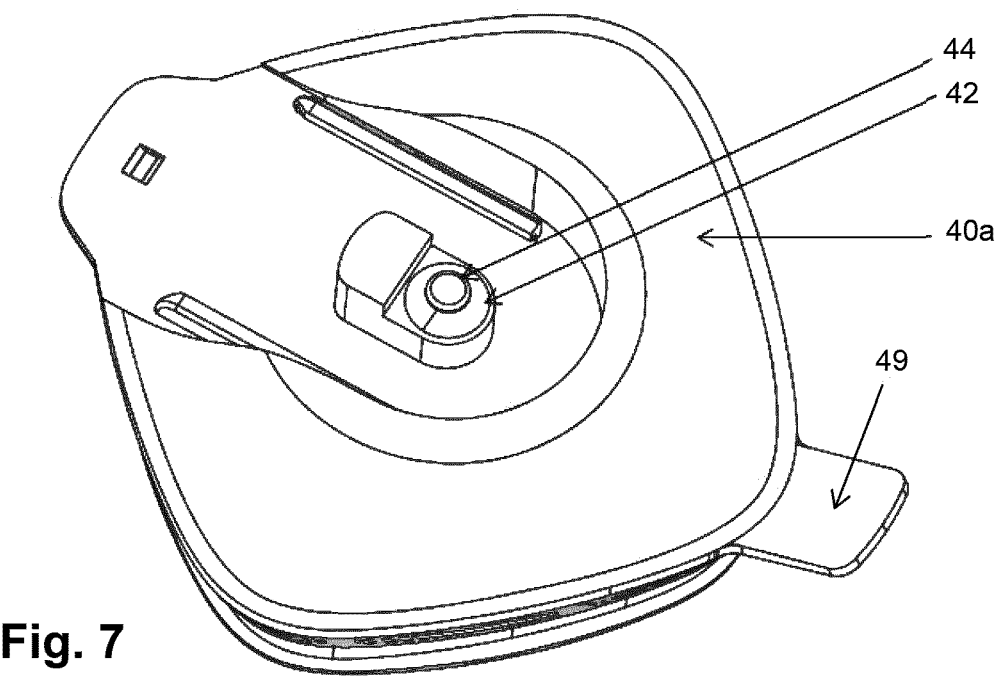
FIG. 7 diagrammatically shows a perspective view of a basic module of the lid that is part of the food processing device shown in FIG. 1.
Figure 8:
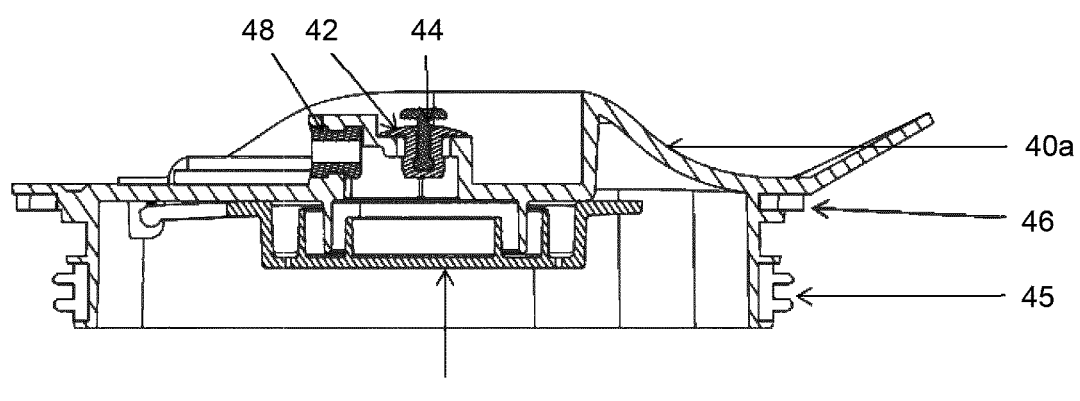
FIG. 8 diagrammatically shows a sectional view of the basic module of the lid shown in FIG. 7.
Figure 9:
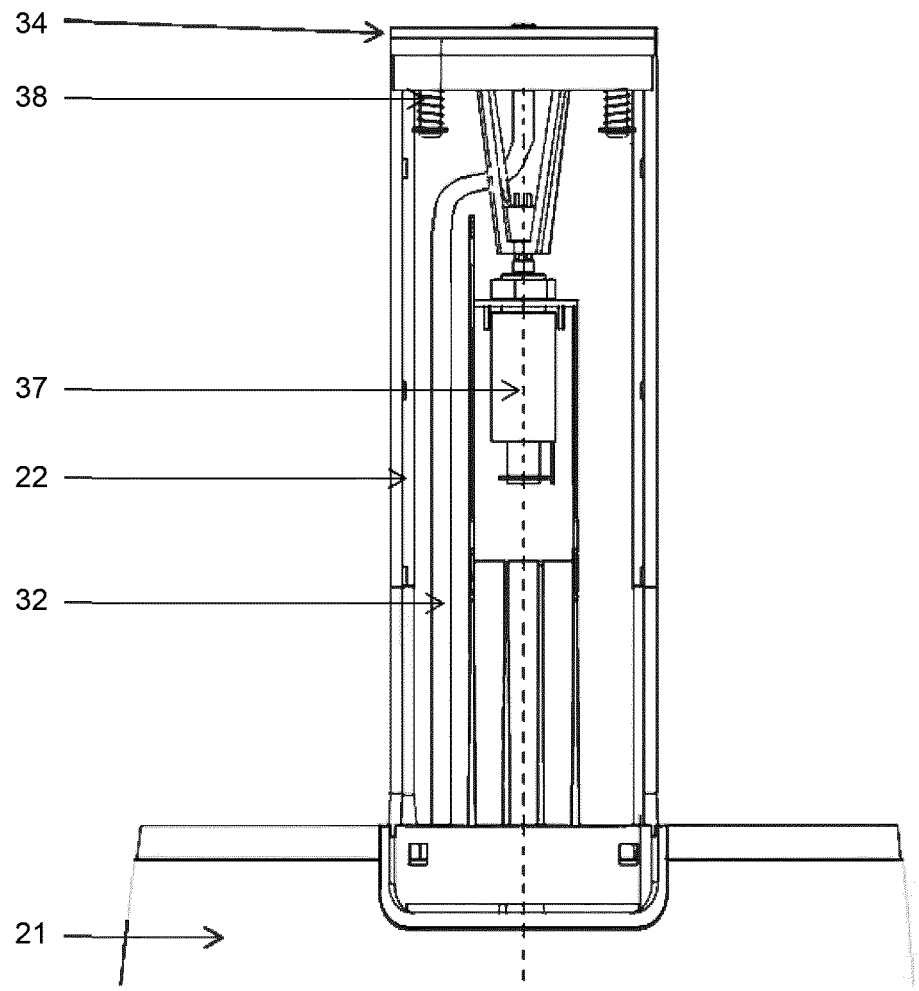
FIG. 9 diagrammatically shows a sectional view of a standing column that is part of a base unit of the food processing device shown in FIG. 1.

FIGS. 5-8 illustrate the fact that the lid 40 comprises two modules, namely a basic module 40*a* as shown in FIGS. 7 and 8, and a vacuum module 40*b* as shown in FIGS. 5 and 6. Only when the lid 40 comprises both modules 40*a*, 40*b*, it is possible to have a combined function of covering the jar 10 and establishing a vacuum path between the jar 10 and the base unit 20. Without the vacuum module 40*b*, the lid 40 is only suitable for covering the jar 10. Hence, in the modular set-up of the lid 40 as shown, a user may choose to only use the basic module 40*a*, or to use both modules 40*a*, 40*b*, according to desire when it comes to realizing vacuum conditions in the jar 10, or not.

The basic module 40*a* of the lid 40 comprises the pressure release valve 42 and a pin 44 for coupling the pressure release button 43 to the pressure release valve 42. Further, the basic module 40*a* of the lid 40 comprises a radial seal 45 and an axial seal 46 for sealing the jar 10 in the vacuum condition, and a detachable filter 47 for preventing liquid or small solid particles from entering the second vacuum conduit 33 during operation of the vacuum pump 31. The detachable filter 47 can be mounted in the basic module 40*a* of the lid 40 in any suitable way, for example by a hinge. Still further, the basic module 40*a* of the lid 40 comprises a nozzle 48 that is designed to receive and encompass an end of the one-way valve 41 that is part of the vacuum module 40*b* of the lid 40. Advantageously, the nozzle 48 comprises a flexible material such as rubber. Besides the one-way valve 41, the vacuum module 40*b* of the lid 40 comprises the second vacuum conduit 33 and the pressure release button 43.

The modular design of the lid 40 offers the advantageous option of only cleaning the basic module 40*a* with water or another cleaning liquid if so desired, while leaving the vacuum module 40*b* out of such wet cleaning action, so that there is no risk of cleaning liquid entering the second vacuum conduit 33. The vacuum module 40*b* is not so much likely to get dirty, as it is the basic module 40*a* that actually serves for covering the jar 10 and that gets exposed to food as may be present in the jar 10. Hence, having at least two different modules 40*a*, 40*b*, one module 40*b* accommodating the second vacuum conduit 33, involves offering optimal cleanability of the lid 40.

In spite of the fact that the modular design of the lid 40 has advantageous aspects, an integrated design of the lid 40 is also covered by the invention. The basic module 40*a* and the vacuum module 40*b* may as well be discernable in an integrated design, but in such a case, the modules 40*a*, 40*b* are integrated with each other so that they cannot be disconnected from each other. When there is no need for realizing vacuum conditions in the jar 10 during the processing of food, the modular design offers the possibility of using only the basic module 40*a* in that case, whereas in the integrated design, the entire lid 40 is always used, whether it is desired to have a vacuum, or not.

The engaging end 35 of the second vacuum conduit 33 comprises a cup-shaped portion 36 of a flexible material such as rubber, so that the engaging end 35 of the second vacuum conduit 33 is capable of engaging the engaging end 34 of the first vacuum conduit 32 in a sealing fashion, assuming a covering position over the engaging end 34 of the first vacuum conduit 32. In the shown example, the engaging end 34 of the first vacuum conduit 32 comprises a planar surface that is to be contacted by the cup-shaped portion 36 of the engaging end 35 of the second vacuum conduit 33, along a rim of the cup-shaped portion 36.

The base unit 20 comprises a bottom module 21 and a standing column 22 extending from the bottom module 21 in an upright direction. In the assembled condition, the jar 10 is supported by the bottom module 21, and the standing column 22 extends alongside the jar 10. The engaging end 34 of the first vacuum conduit 32 is located at the top of the standing column 22. With specific reference to FIG. 9, it is noted that the engaging end 34 of the first vacuum conduit 32 is displaceable in the standing column 22, and that an actuator 37 is arranged in the standing column 22, at a lower level, so as to act on the engaging end 34 and to push the engaging end 34 in an outward direction, i.e. towards the engaging end 35 of the second vacuum conduit 33 as present in the lid 40. It is to be noted that an operative position of the jar 10 and the lid 40 with respect to the base unit 20 is a position in which the first vacuum conduit 32 and the second vacuum conduit 33 are aligned with each other at the level of their respective engaging ends 34, 35.

The bottom module 21 of the base unit 20 accommodates a motor 11 that serves for driving a cutting tool 12 that is rotatably arranged in the jar 10 in the assembled condition of the food processing device 100. As known per se, the cutting tool 12 is connected to the motor 11 through suitable couplings 13, 14, and is supported on a tool holder 15, wherein a collar 16 is used to ensure fixed mounting of the cutting tool 12. The invention is in no way limited to any possible details of the cutting tool 12 or any other tool for processing food nor to the mechanisms for supporting and driving the tool.

For the purpose of controlling operation of the food processing unit 100, a controller 17 is provided. In the shown example, the controller 17 is arranged in the bottom module 21 of the base unit 20 and is equipped with a pressure sensor 18. Hence, the controller 17 is suitable to be used for controlling the operation of the vacuum mechanism 30. In general, the controller 17 may comprise any suitable type of electronic hardware, and may be designed to ensure proper realization of all operational aspects of the food processing unit 100. A user interface 23 comprising a number of buttons, including a vacuum activation button 24, is arranged on the bottom module 21 of the base unit 20 so as to allow the user to provide appropriate input to the controller 17.

Starting from an unassembled condition of the food processing device 100, the following steps are taken for the purpose of operating the device 100 so as to process food under vacuum conditions. In the first place, a user of the device 100 makes sure that the cutting tool 12 is correctly mounted in the jar 10. After filling the jar 10 with food to be processed, the user puts the lid 40 in place on the jar 10, pushing the lid 40 down in the jar 10 along a limited length. The vacuum module 40b of the lid 40 is mounted to the basic module 40a of the lid 40 by mechanical means, wherein an end of the one-way valve 41 as present in the vacuum module 40b is inserted into the nozzle 48 as present in the basic module 40a. By means of the lid 40 comprising the two modules 40a, 40b, the jar 10 is covered and sealed.

In the second place, the assembly of the jar 10 and the lid 40 is put in place in the base unit 20. In the process, the cutting tool 12 is connected to the motor 11 through the couplings 13, 14. Correct positioning of the assembly of the jar 10 and the lid 40 in the base unit 20 is achieved when the cup-shaped portion 36 of the engaging end 35 of the second vacuum conduit 33 as present in the lid 40 is aligned with the engaging end 34 of the first vacuum conduit 32 as present in the base unit 20, particularly at the top of the standing column 22 thereof. The user can be assisted in realizing such correct positioning by visual markers. In the shown example, the position of the engaging end 35 of the second vacuum conduit 33 is a position opposite to the position of a tab 49 of the lid 40 that is to be aligned with a handle 19 of the jar 10, and the bottom module 21 of the base unit 20 is designed to receive the jar 10 in a predetermined angular position, namely a position in which the handle 19 of the jar 10 is opposite to the standing column 22 of the base unit 20.

The process of realizing a vacuum in the jar 10 is started when the user depresses the vacuum activation button 24. As a first step in the process, the actuator 37 pushes the engaging end 34 of the first vacuum conduit 32 in an outward direction so as to establish engagement between the engaging end 34 of the first vacuum conduit 32 and the engaging end 35 of the second vacuum conduit 33 and to thereby realize a continuous vacuum path from the jar 10 to the vacuum pump 31. A distance along which the engaging end 34 of the first vacuum conduit 32 is displaced may be as small as a distance in a range of 2 mm to 5 mm, so that it is possible to have an actuator that is relatively small and cheap. Further, the vacuum pump 31 is switched on, so that the vacuum condition as desired is realized in the jar 10. As long as the vacuum pump 31 is in an operative condition, a sealed engagement between the respective engaging ends 34, 35 of the first vacuum conduit 32 and the second vacuum conduit 33 is guaranteed. The operative condition of the vacuum pump 31 is maintained until the pressure sensor 18 detects a predetermined maximum vacuum pressure, which may be in a range of −75 kPa to −90 kPa, for example, at which point the vacuum pump 31 is automatically shut off by the controller 17. When the vacuum pump 31 is in the off condition, the one-way valve 41 acts to prevent loss of vacuum from the jar 10. At the interface between the lid 40 and the base unit 20, however, the influence of the vacuum is lost, as a result of which the engaging end 34 of the first vacuum conduit 32 is pulled down by a set of tension springs 38 especially provided for the purpose of putting the engaging end 34 back to a retracted position in the base unit 20.

As soon as the vacuum condition as desired has been realized in the jar 10 in the way as described in the foregoing, the cutting tool 12 can be rotated for the purpose of cutting and mixing the food that is present in the jar 10. When the food processing has stopped, the assembly of the jar 10 and the lid 40 can be removed from the base unit 20. The user depresses the pressure release button 43 to allow an inflow of air in the jar 10, after which the lid 40 can easily be removed from the jar 10 and the food can be reached.

Figure 10:
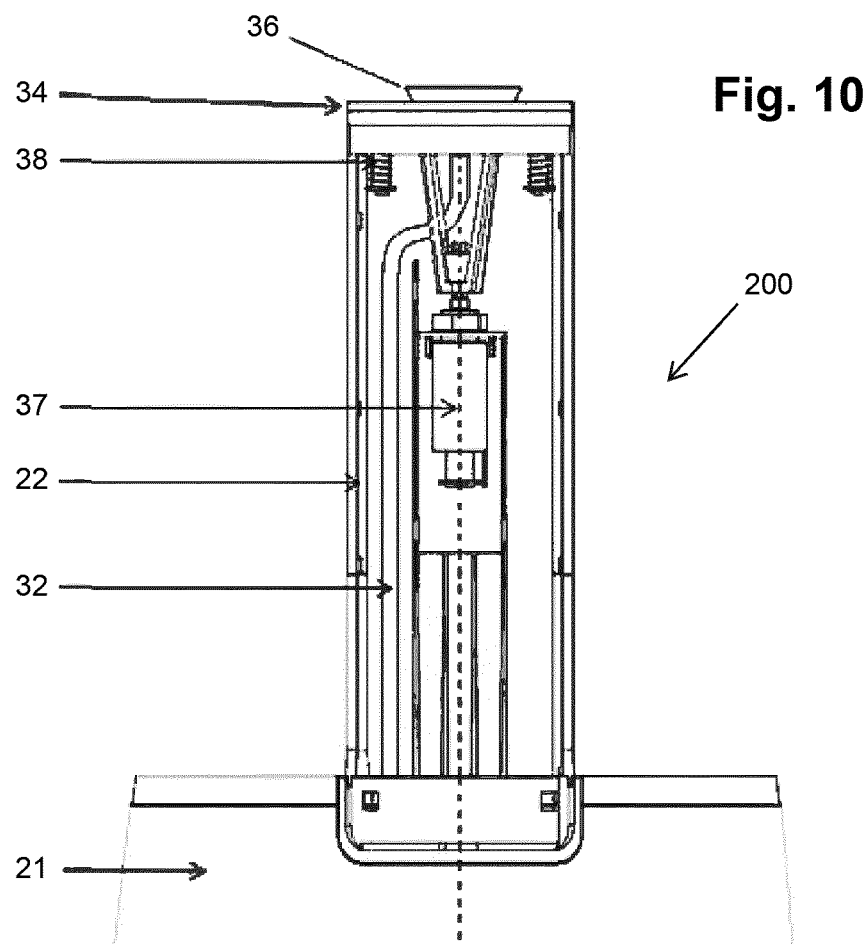
FIG. 10 diagrammatically shows a sectional view of a standing column that is part of a base unit of a food processing device according to a second embodiment of the invention.
Figure 11:
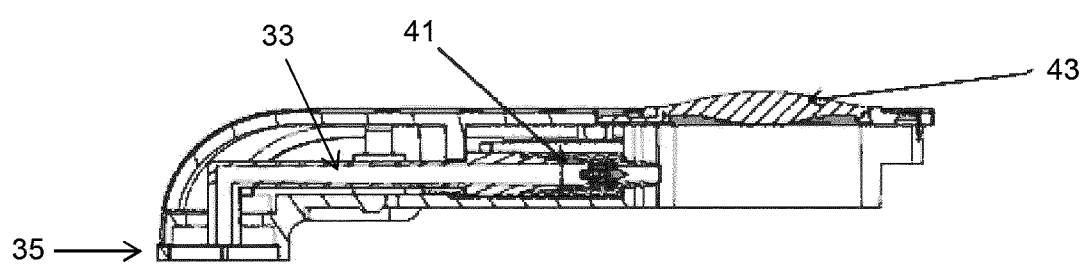
FIG. 11 diagrammatically shows a sectional view of a vacuum module of a lid that is part of the food processing device according to the second embodiment of the invention.

FIGS. 10 and 11 relate to a food processing device 200 according to a second embodiment of the invention. The food processing device 200 according to the second embodiment of the invention is the same as the food processing device 100 according to the first embodiment of the invention, apart from the fact that in the food processing device 200 according to the second embodiment of the invention, it is the engaging end 34 of the first vacuum conduit 32 that comprises a cup-shaped portion 36, and it is the engaging end 35 of the second vacuum conduit 33 that comprises a planar surface.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

The invention claimed is:
1. A food processing device, comprising:
a jar configured to contain food,
a base unit configured to support and accommodate the jar,
a vacuum mechanism configured to suck air from the jar, comprising a vacuum pump arranged in the base unit and a first vacuum conduit extending through the base unit and being coupled to the vacuum pump, and
a lid configured to cover the jar and to realize air communication between the jar and the base unit, wherein the vacuum mechanism further comprises a second vacuum conduit extending through the lid,
wherein the first vacuum conduit and the second vacuum conduit are engageable to each other through respective engaging ends thereof,
   wherein at least one of the engaging ends of the first vacuum conduit and the second vacuum conduit is displaceable between an outward position and a retracted position in the respective one of the base unit and the lid, wherein the first vacuum conduit and the second vacuum conduit are engaged to each other when the at least one of the engaging ends of the first vacuum conduit and the second vacuum conduit is at the outward position in the respective one of the base unit and the lid, and wherein the first vacuum conduit and the second vacuum conduit are disengaged from each other when the at least one of the engaging ends of the first vacuum conduit and the second vacuum conduit is at the retracted position in the respective one of the base unit and the lid, and
   wherein the food processing device comprises a driven actuator configured to displace the at least one of the engaging ends of the first vacuum conduit and the second vacuum conduit in the respective one of the base unit and the lid to the outward position, and at least one resilient member configured to bias the at least one of the engaging ends of the first vacuum conduit and the second vacuum conduit in the respective one of the base unit and the lid to the retracted position.

2. The food processing device according to claim 1, wherein one of the engaging ends of the first vacuum conduit and the second vacuum conduit is displaceable in the respective one of the base unit and the lid, and wherein the other of the engaging ends has a fixed position in the respective other of the base unit and the lid.

3. The food processing device according to claim 2, wherein the engaging end of the first vacuum conduit is displaceable in the base unit, and wherein the engaging end of the second vacuum conduit has a fixed position in the lid.

4. The food processing device according to claim 2, wherein the engaging end of the second vacuum conduit is displaceable in the lid, and wherein the engaging end of the first vacuum conduit has a fixed position in the base unit.

5. The food processing device according to any of claim 1, wherein the lid includes a cover area configured to cover the jar and a protruding area outside of the cover area, and wherein the engaging end of the second vacuum conduit is located in the protruding area.

6. The food processing device according to claim 1, wherein the second vacuum conduit comprises a hollow tube configured to allow a flow of air to pass through.

7. The food processing device according to claim 1, wherein the driven actuator is a linear actuator that is driven by an electric motor.

8. The food processing device according to claim 1, wherein the at least one resilient member is at least one spring.

9. The food processing device according to claim 1, wherein one of the engaging ends of the first vacuum conduit and the second vacuum conduit comprises a flexible material and is configured to have a covering position over the other of the engaging ends.

10. The food processing device according to claim 1, wherein the lid comprises at least two modules, wherein one of the modules is a vacuum module in which the second vacuum conduit is located, and wherein the vacuum module is detachable from the at least one other module.

11. The food processing device according to claim 1, wherein the lid includes a one-way valve for only allowing a flow of air in the lid to be directed towards the engaging end of the second vacuum conduit, thereby preventing a reverse flow of air in the lid.

12. The food processing device according to claim 1, wherein the lid includes a pressure release valve for realizing air communication between the jar and the outside air.

* * * * *